(12) United States Patent
Jin

(10) Patent No.: US 12,092,874 B2
(45) Date of Patent: Sep. 17, 2024

(54) SILICON PHOTONIC PACKAGE AND METHOD OF FABRICATING THE SAME

(71) Applicant: OIP Technology Pte Ltd, Singapore (SG)

(72) Inventor: Yonggang Jin, Singapore (SG)

(73) Assignee: OIP TECHNOLOGY PTE LTD., Singapore (SG)

( * ) Notice: Subject to any disclaimer, the term of this patent is extended or adjusted under 35 U.S.C. 154(b) by 224 days.

(21) Appl. No.: 17/948,512

(22) Filed: Sep. 20, 2022

(65) Prior Publication Data
US 2024/0036262 A1 Feb. 1, 2024

(30) Foreign Application Priority Data
Jul. 29, 2022 (CN) .......................... 202210911105.7

(51) Int. Cl.
*G02B 6/30* (2006.01)
*G02B 6/12* (2006.01)
*G02B 6/42* (2006.01)

(52) U.S. Cl.
CPC ................. *G02B 6/30* (2013.01); *G02B 6/12* (2013.01); *G02B 6/4214* (2013.01); *G02B 6/4268* (2013.01); *G02B 6/4269* (2013.01)

(58) Field of Classification Search
CPC ...... G02B 6/30; G02B 6/4269; G02B 6/4214; G02B 6/424; G02B 6/12; G02B 6/4237; G02B 6/4255; G02B 6/4268
See application file for complete search history.

(56) References Cited

U.S. PATENT DOCUMENTS

2012/0189244 A1* 7/2012 Bowen ................. G02B 6/4214
385/14

* cited by examiner

*Primary Examiner* — Michael P Mooney
(74) *Attorney, Agent, or Firm* — MUNCY, GEISSLER, OLDS & LOWE, P.C.

(57) ABSTRACT

A silicon photonic package and a method of fabricating the package are disclosed. The silicon photonic package includes an optical waveguide structure, a heat dissipation structure, a plastic encapsulation layer, first and second structures. The optical waveguide structure is a right trapezoidal structure, and a surface where a non-right angle leg thereof is a totally reflecting surface capable of totally reflecting an optical signal that enters the optical waveguide structure from a surface where a right angle leg is disposed in a direction parallel to bases to a plane where a front face of the plastic encapsulation layer is disposed. The heat dissipation structure and the optical waveguide structure are spaced apart from each other and both embedded in the plastic encapsulation layer. The optical waveguide structure of the present invention allows a great reduction in loss of an optical signal incurred by its propagation in the optical waveguide structure.

15 Claims, 1 Drawing Sheet

SILICON PHOTONIC PACKAGE AND METHOD OF FABRICATING THE SAME

CROSS-REFERENCES TO RELATED APPLICATION

This application claims the priority of Chinese patent application number 202210911105.7, filed on Jul. 29, 2022, the entire contents of which are incorporated herein by reference.

TECHNICAL FIELD

The present invention relates to the field of optics and, in particular, to a silicon photonic package and a method of fabricating the package.

BACKGROUND

There are two options for propagation of light in a silicon photonic module. In the first option, a straight-line optical path is formed in a polymer material on a PCB substrate. An input end of the optical path is connected to an optical fiber, and an output end thereof is connected to a photonic chip. Since the optical path is situated below the connected end of the photonic chip, it must have a right-angle extension extending from the output end to the connected end of the photonic chip. After an optical signal enters the optical path from the input end, it will experience diffuse reflection around the other end, leading to escape of a fraction of the optical signal into the photonic chip via the extension. This loss of the optical signal during propagation in the optical path is significant (only about 10%-20% of the optical signal at the time of entry into the optical path remains). In the second option, a thin silica film is formed as an optical waveguide structure on a silicon substrate. The optical waveguide structure is shaped substantially the same as the optical path and coupled at one end to an optical fiber. Since the thin silica film is thinner than the optical path, the optical waveguide structure suffers from even more significant optical signal loss. Further, as the silica material is incapable of directly processing an optical signal transmitted from the optical fiber, it is necessary to convert the optical signal into a form acceptable to a photonic chip. Therefore, it is unsuitable to directly couple the optical waveguide structure at the other end to a photonic chip.

SUMMARY

It is an objective of the present invention to provide a silicon photonic package and a method of fabricating the package, which allows for reduced loss of an optical signal before it enters a photonic chip.

To this end, the present invention provides a silicon photonic package, including an optical waveguide structure, a heat dissipation structure, a plastic encapsulation layer, a first structure, a second structure and a photonic chip, the optical waveguide structure implemented as a right trapezoidal structure having opposing front and back faces, a longitudinal cross-section of which includes opposing first and second bases and opposing first and second legs, the first base disposed on the front face of the optical waveguide structure, the second base disposed on the back face of the optical waveguide structure, the first base having a length greater than a length of the second base, the first base and the first leg forming therebetween an angle of 90°, the first base and the second leg forming therebetween an angle of around 45°, the optical waveguide structure connected to an optical fiber in a plane where the first leg is disposed, the second leg disposed on a totally reflecting surface capable of totally reflecting an optical signal that enters the optical waveguide structure from a surface where the first leg is disposed in a direction parallel to the front face to a plane where the first base is disposed, the heat dissipation structure spaced apart from the optical waveguide structure and embedded together therewith in the plastic encapsulation layer, the heat dissipation structure having opposing front and back faces, the second leg disposed between the heat dissipation structure and the first leg;

the plastic encapsulation layer having opposing front and back faces and opposing first and second side faces, the front faces of the optical waveguide structure, the heat dissipation structure and the plastic encapsulation layer disposed on the same side, the first side face of the plastic encapsulation layer disposed parallel to the plane where the first leg is disposed, the first leg disposed between the first side face and the second leg, the front faces of the optical waveguide structure and the heat dissipation structure exposed from the front face of the plastic encapsulation layer, the back face of the heat dissipation structure exposed from the back face of the plastic encapsulation layer, the back face of the optical waveguide structure disposed between the front and back faces of the plastic encapsulation layer, the plastic encapsulation layer provided therein with multiple through holes extending through the plastic encapsulation layer along its thickness direction, the multiple through holes filled therein with a conductive material, the first structure disposed on the front face of the plastic encapsulation layer, the first structure electrically connected on the side of the front face of the plastic encapsulation layer to the conductive material in the through holes and to the heat dissipation structure, the second structure disposed on the back face of the plastic encapsulation layer, the second structure electrically connected on the side of the back face of the plastic encapsulation layer to the conductive material in the through holes and to the heat dissipation structure, the photonic chip disposed on the first structure such as to be electrically connected to the first structure and optically connected to the front face of the optical waveguide structure.

Optionally, the angle formed between the first base and the second leg may be 45°.

Optionally, the optical waveguide structure may include a light guide and a low-reflectivity coating applied to a surface of the light guide, wherein the light guide is made of glass, and wherein the low-reflectivity coating has a reflectivity lower than a reflectivity of the light guide and thus enables an optical signal that enters the optical waveguide structure from the surface where the first leg is disposed in the direction parallel to the front face of the optical waveguide structure to be totally reflected by the surface where the second leg is disposed to the plane where the first base is disposed.

Additionally, the optical waveguide structure may be provided in the plane where the first leg is disposed with a connection port adapted for connection of the optical fiber, wherein the light guide is exposed from the low-reflectivity coating at the connection port.

Additionally, the plastic encapsulation layer may be provided in the front face thereof with guide grooves, which extend through the plastic encapsulation layer between the first side face and the connection port, and in which the optical fiber is placed.

Additionally, the guide grooves may be V-shaped grooves.

Additionally, the optical waveguide structure may be provided in the front face with a light exit port, at which the light guide is exposed from the low-reflectivity coating, and which is adapted for connection of the photonic chip and for passage therethrough of an optical signal that enters the optical waveguide structure from the connection port in the direction parallel to the front face of the optical waveguide structure and is totally reflected by the surface where the second leg is disposed to the photonic chip in a direction perpendicular to the front face of the optical waveguide structure.

Additionally, the light exit port may have a circular or rectangular shape.

Additionally, the photonic chip may have an optical connection port and an electrical connection port, wherein the optical connection port is optically connected to the light exit port and the electrical connection port is electrically connected to the first structure.

Optionally, the optical waveguide structure may have a thickness ranging from 100 μm to 150 μm.

Optionally, the first structure may include a first passivation layer, a first metal layer and a second passivation layer, which are formed sequentially over the front face of the plastic encapsulation layer, the first passivation layer covering the front faces of the plastic encapsulation layer, the heat dissipation structure and the optical waveguide structure, with the conductive material in the through holes, a front face portion of the heat dissipation structure, the light exit port of the optical waveguide structure and the guide grooves in the front face of the plastic encapsulation layer being exposed therefrom on the side of the front face of the plastic encapsulation layer, the first metal layer disposed on part of the first passivation layer, the first metal layer including multiple first bond pads electrically connected to the conductive material in the through holes and the heat dissipation structure, the second passivation layer covering the first passivation layer and the first metal layer, the second passivation layer provided therein with at least two first connection holes in which the first metal layer is exposed, the first connection holes filled with a conductive material for electrical connection with the photonic chip.

Optionally, the second structure may include a third passivation layer, a second metal layer and a fourth passivation layer, which are formed sequentially over the back face of the plastic encapsulation layer, the third passivation layer covering the back faces of the plastic encapsulation layer and the heat dissipation structure, with the conductive material in the through holes and a back face portion of the heat dissipation structure being exposed from the back face of the plastic encapsulation layer, the second metal layer including multiple second bond pads disposed on part of the third passivation layer and electrically connected to the conductive material in the through holes and to the heat dissipation structure, the fourth passivation layer covering the third passivation layer and the second metal layer, the fourth passivation layer provided therein with at least two second connection holes in which the second metal layer is exposed, the second connection holes filled with a conductive material for electrical connection with an external circuit.

In another aspect, the present invention also provides a method of fabricating a silicon photonic package, suitable for use with the silicon photonic package as defined above. The method includes the steps of:

providing an optical waveguide structure and a heat dissipation structure to be packaged, the optical waveguide structure implemented as a right trapezoidal structure having opposing front and back faces, a longitudinal cross-section of which includes opposing first and second bases and opposing first and second legs, the first base disposed on the front face of the optical waveguide structure, the second base disposed on the back face of the optical waveguide structure, the first base having a length greater than a length of the second base, the first base and the first leg forming therebetween an angle of 90°, the first base and the second leg forming therebetween an angle of around 45°, the optical waveguide structure connected to an optical fiber in a plane where the first leg is disposed, the second leg disposed on a totally reflecting surface capable of totally reflecting an optical signal that enters the optical waveguide structure from a surface where the first leg is disposed in a direction parallel to the front face to a plane where the first base is disposed, the heat dissipation structure having opposing front and back faces, the second leg disposed between the heat dissipation structure and the first leg;

providing a first carrier plate with a first adhesive layer formed on one side thereof and placing the optical waveguide structure and the heat dissipation structure on the first adhesive layer so that they are spaced apart from each other, wherein the front faces of the heat dissipation structure and the optical waveguide structure both face the first adhesive layer;

filling a plastic encapsulation material in between the optical waveguide structure and the heat dissipation structure and curing the plastic encapsulation material to form a plastic encapsulation layer, the plastic encapsulation layer having opposing front and back faces and opposing first and second side faces, the front faces of the optical waveguide structure, the heat dissipation structure and the plastic encapsulation layer disposed on the same side, the first side face of the plastic encapsulation layer disposed parallel to the plane where the first leg is disposed, the first leg disposed between the first side face and the second leg, front faces of the optical waveguide structure and the heat dissipation structure exposed from the front face of the plastic encapsulation layer, the back face of the heat dissipation structure exposed from the back face of the plastic encapsulation layer, the back face of the optical waveguide structure disposed between the front and back faces of the plastic encapsulation layer;

removing the first carrier plate;

forming in the plastic encapsulation layer multiple through holes extending through the plastic encapsulation layer in its thickness direction, filling a conductive material in the multiple through holes, forming on the front face of the plastic encapsulation layer a first structure electrically connected on the side of the front face of the plastic encapsulation layer to the conductive material in the through holes and to the heat dissipation structure, and forming on the back face of the plastic encapsulation layer a second structure electrically connected on the side of the back face of the plastic encapsulation layer to the conductive material in the through holes and to the heat dissipation structure; and providing a photonic chip and fixing it to the first structure in such a manner that it is electrically connected to the first structure and optically connected to the front face of the optical waveguide structure.

Optionally, guide grooves may be formed in the front face of the plastic encapsulation layer in such a manner that they extend through the plastic encapsulation layer between the first side face and a connection port and that the connection port is exposed in them.

Optionally, the photonic chip may have an optical connection port and an electrical connection port, wherein the optical connection port is optically connected to a light exit port and the electrical connection port is electrically connected to the first structure.

Compared with the prior art, the present invention has the following benefits:

The present invention provides a silicon photonic package and a method of fabricating the package. The silicon photonic package includes an optical waveguide structure, a heat dissipation structure, a plastic encapsulation layer, a first structure, a second structure and a photonic chip. The optical waveguide structure is a right trapezoidal structure having opposing front and back faces, a longitudinal cross-section of which has opposing first and second bases and opposing first and second legs. The first base is disposed on the front face of the optical waveguide structure, and the second base on the back face of the optical waveguide structure. A length of the first base is greater than a length of the second base, and an angle between the first base and the first leg is 90°. An angle between the first base and the second leg is around 45°. The optical waveguide structure is connected to an optical fiber in a plane where the first leg is disposed. The heat dissipation structure and the optical waveguide structure are spaced apart from each other and are both embedded in the plastic encapsulation layer. The heat dissipation structure has opposing front and back faces, and the second leg is disposed between the heat dissipation structure and the first leg. The plastic encapsulation layer has opposing front and back faces and opposing first and second side faces. The front faces of the optical waveguide structure, the heat dissipation structure and the plastic encapsulation layer are disposed on the same side. The first side face of the plastic encapsulation layer is disposed parallel to the plane where the first leg is disposed, and the first leg is disposed between the first side face and the second leg. The front faces of the optical waveguide structure and the heat dissipation structure are exposed from the front face of the plastic encapsulation layer, and the back face of the heat dissipation structure is exposed from the back face of the plastic encapsulation layer. The back face of the optical waveguide structure is disposed between the front and back faces of the plastic encapsulation layer. The plastic encapsulation layer is provided therein with multiple through holes extending through the plastic encapsulation layer in the thickness direction, and a conductive material is filled in the multiple through holes. The first structure is disposed on the front face of the plastic encapsulation layer and is electrically connected on the side of the front face of the plastic encapsulation layer to the conductive material in the through holes and to the heat dissipation structure. The second structure is disposed on the back face of the plastic encapsulation layer and is electrically connected on the side of the back face of the plastic encapsulation layer to the conductive material in the through holes and to the heat dissipation structure. The photonic chip is disposed on the first structure, electrically connected to the first structure and optically connected to the front face of the optical waveguide structure. When an optical signal propagates in the optical waveguide structure of the present invention, it will experience substantially no loss. Therefore, the optical waveguide structure allows for a significant reduction in propagation loss of an optical signal. Moreover, embedding the optical waveguide structure and the heat dissipation structure in the plastic encapsulation layer results in improved heat dissipation performance. In addition, in the silicon photonic package of the present invention, directly forming the first and second structures on the opposite sides of the plastic encapsulation layer in lieu of the conventional PCB substrate and optical path results in higher spatial utilization and allows the silicon photonic package to have a smaller size, resulting in space savings.

DESCRIPTION OF REFERENCE NUMERALS IN DRAWINGS

1: Optical Fiber; 110: Optical Waveguide Structure; 111: Light Guide; 111a: First Base; 111b: Second Base; 111c: First Leg; 111d: Second Leg; 112: Low-Reflectivity Coating; 120: Heat Dissipation Structure; 130: Plastic Encapsulation Layer; 140: Through Hole; 150: Guide Groove; 210: First Passivation Layer; 211: Light Exit Port; 220: First Metal Layer; 230: Second Passivation Layer; 240: First Connection Hole; 310: Third Passivation Layer; 320: Second Metal Layer; 330: Fourth Passivation Layer; 340: Second Connection Hole.

DETAILED DESCRIPTION

The silicon photonic package and method of its fabrication according to the present invention will be described in greater detail below. The present invention will be described in greater detail below with reference to the accompanying drawings, which present preferred embodiments of the invention. It would be appreciated that those skilled in the art can make changes to the invention disclosed herein while still obtaining the beneficial results thereof. Therefore, the following description shall be construed as being intended to be widely known by those skilled in the art rather than as limiting the invention.

For the sake of clarity, not all features of actual implementations are described in this specification. In the following, description and details of well-known functions and structures are omitted to avoid unnecessarily obscuring the invention. It should be appreciated that in the development of any such actual implementation, numerous implementation-specific decisions must be made to achieve specific goals of the developers, such as compliance with systemrelated and business-related constrains, which may vary from one implementation to another. Moreover, it should be appreciated that such a development effort might be complex and time consuming, but would nevertheless be a routine undertaking for those of ordinary skill in the art.

Objects and features of the present invention will become more apparent upon reading the following more detailed description thereof made with reference to the accompanying drawings and particular embodiments. Note that the figures are provided in a very simplified form not necessarily drawn to exact scale and for the only purpose of facilitating easy and clear description of the disclosed embodiments.

Figure 1:
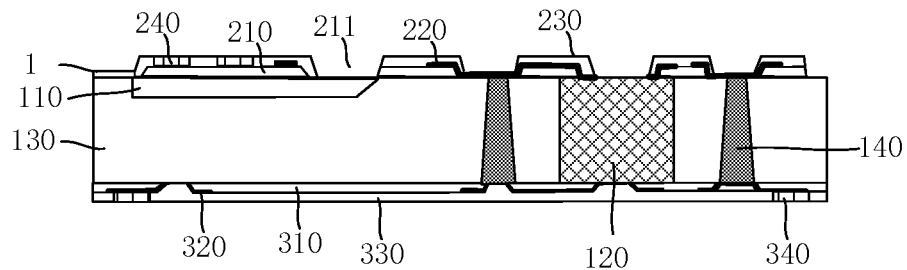
FIG. 1 is a schematic diagram showing the structure of a silicon photonic package according to an embodiment of the present invention.

FIG. 1 is a schematic diagram showing the structure of a silicon photonic package according to an embodiment of the present invention. As shown in FIG. 1, the silicon photonic package according to this embodiment includes an optical waveguide structure 110, a heat dissipation structure 120 and a plastic encapsulation layer 130. The optical waveguide structure 110 and the heat dissipation structure 120 are spaced apart from each other and embedded in the plastic encapsulation layer 130. The plastic encapsulation layer 130 has opposing front and back faces. The plastic encapsulation layer 130 has opposing first and second side faces. Both the first and second side faces connect the front face of the plastic encapsulation layer 130 and the back face of the plastic encapsulation layer 130. Both the optical waveguide structure 110 and the heat dissipation structure 120 have opposing front and back faces. The front faces of the plastic encapsulation layer 130, the optical waveguide structure 110 and the heat dissipation structure 120 are disposed on the same side. The front faces of the optical waveguide structure 110 and the heat dissipation structure 120 are exposed from the front face of the plastic encapsulation layer 130, and the back face of the heat dissipation structure 120 is exposed from the back face of the plastic encapsulation layer 130. A thickness of the plastic encapsulation layer 130 is equal to a thickness of the heat dissipation structure 120, while the thickness of the heat dissipation structure 120 is greater than a thickness of the optical waveguide structure 110. As a result, the back face of the optical waveguide structure 110 is not exposed from the back face of the plastic encapsulation layer 130. That is, the back face of the optical waveguide structure 110 is disposed between the front and back faces of the plastic encapsulation layer 130.

Figure 3:
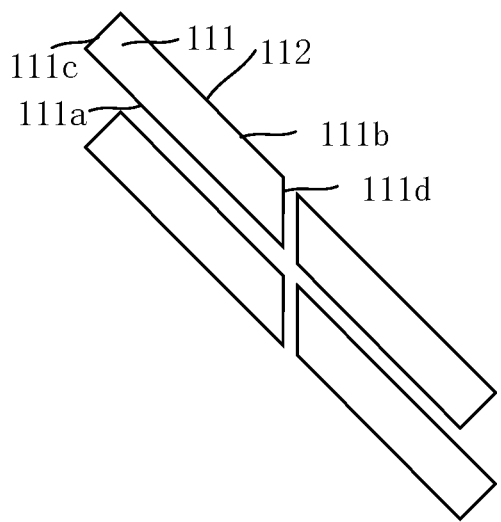
FIG. 3 is a schematic diagram showing the structure of an optical waveguide structure according to an embodiment of the present invention.

FIG. 3 is a schematic diagram showing the structure of the optical waveguide structure according to this embodiment. As shown in FIG. 3, the optical waveguide structure 110 is a right trapezoidal structure having a right trapezoidal cross-section taken along the thickness direction (i.e., longitudinal cross-section). Accordingly, the optical waveguide structure 110 has opposing first 111a and second 111b bases and opposing first leg 111c and second leg 111d. The first base 111a is formed on the front face of the optical waveguide structure, and the second base 111b on the back face of the optical waveguide structure 110. The first side face of the plastic encapsulation layer is parallel to a plane where the first leg 111c is disposed, and the first leg 111c is formed between the first side face and the second leg 111d. Additionally, the first leg 111c is disposed proximate the first side face, and the second leg 111d proximate the second side face, so that the second leg 111d is disposed between the heat dissipation structure and the first leg 111c. A length of the first base 111a is greater than a length of the second base 111b, and an angle between the first base 111a and the first leg 111c is 90°. An angle between the first base 111a and the second leg 111d is around 45°. The angle between the first base 111a and the second leg 111d may be in the range of 40°-50°. Preferably, the angle between the first base 111a and the second leg 111d may be 45°.

The optical waveguide structure 110 is connected to an optical fiber in a plane where the first leg 111c is disposed. The second leg 111d is disposed on a totally reflecting surface, which can totally reflect an optical signal entering the optical waveguide structure 110 from a surface where the first leg 111c is disposed along a direction parallel to the front face of the plastic encapsulation layer to a plane where the first base is disposed. Stated in greater detail, the optical waveguide structure 110 includes a light guide 111 and a low-reflectivity coating 112 applied to one surface of the light guide 111. The light guide 111 is made of glass, and the low-reflectivity coating 112 has a reflectivity lower than a reflectivity of the light guide 111, thereby enabling an optical signal that enters the optical waveguide structure 110 from the surface where the first leg 111c is disposed along the direction parallel to the front face of the optical waveguide structure 110 to be totally reflected by the surface where the second leg 111d is disposed to the plane where the first base 111a is disposed. The thickness of the optical waveguide structure 110 ranges from 100 μm to 150 μm. In the state of the art, it is difficult to make an optical path with two materials with different reflectivities on a PCB substrate. Moreover, in the semiconductor industry, the only available materials suitable for transmission of optical signals are silica and silicon nitride, which, however, have comparable reflectivities and does allow total reflection of an optical signal. In contrast, in the present embodiment, the use of the higher-reflectivity light guide 111 and the lower-reflectivity coating 112 in the optical waveguide structure 110 enables total reflection of an optical signal within the optical waveguide structure 110. Moreover, the optical waveguide structure 110 according to the present embodiment can directly process an optical signal from the optical fiber during its propagation therein, without additional processing means.

The optical waveguide structure 110 is provided, on the surface proximate the first side face, with a connection port (not shown in the figures), to which the optical fiber 1 is connected, and the light guide 111, is exposed from the low-reflectivity coating 112 at the connection port, in order to allow an optical signal from the optical fiber 1 to directly enter the light guide 111 at the connection port.

A light exit port 211 is provided on the front face of the optical waveguide structure 110, and the light guide is exposed from the low-reflectivity coating at the light exit port 211. The light exit port 211 is provided to connect a photonic chip. After an optical signal that enters the optical waveguide structure 110 from the connection port in the direction parallel to the front face of the optical waveguide structure 110 is totally reflected by the surface where the second leg 111d is disposed, it is guided out from the light exit port in a direction perpendicular to the front face of the optical waveguide structure 110. Throughout this process, there is substantially no loss of the optical signal. The light exit port 211 has a regular shape, such as circular, rectangular or the like. In case of the light exit port 211 being circular, it may have a diameter ranging from 50 μm to 100 μm. When the light exit port 211 is rectangular, its four sides may be all 50 μm to 100 μm long.

Examples of a material from which the plastic encapsulation layer 130 can be fabricated may include epoxy resins, particles containing 85%-90% of silica and polymer materials. At present, PCB substrates rely on surface copper for heat dissipation. However, since the coefficient of thermal expansion of copper is greater than that of the PCB substrate, it fails to balance the PCB substrate's coefficients of thermal expansion. In the present embodiment, the heat dissipation structure 120 may be formed of a metallic (e.g., a composite metallic material containing aluminum nitride), ceramic or other material, which enables the heat dissipation structure to have a coefficient of thermal expansion smaller than that of the plastic encapsulation layer. As a result, the silicon photonic package has a low coefficient of thermal expansion. That is, a balance can be achieved between heat dissipation and the coefficient of thermal expansion of the silicon photonic package.

The plastic encapsulation layer 130 is provided therein with through holes 140 extending through the plastic encapsulation layer 130 from the front to back face in the thickness direction thereof, and a conductive material is filled in the through holes 140 for electrical connection of circuitry on the front face of the plastic encapsulation layer 130 to circuitry on the back face of the plastic encapsulation layer 130. The conductive material is, for example, a conductive metal such as copper (Cu), tungsten (W), silver (Ag) or gold (Au), a conductive alloy or a conductive paste.

Figure 2:
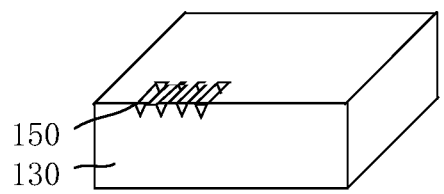
FIG. 2 is a schematic diagram showing the structure of guide grooves according to an embodiment of the present invention.

FIG. 2 is a schematic diagram showing the structure of guide grooves according to the present embodiment. As shown in FIG. 2, the guide grooves 150 are formed in the front face of the plastic encapsulation layer 130 so as to extend from the first leg 111c toward the second leg 111d through a portion of the plastic encapsulation layer 130 between the first side face and the connection port so that the optical waveguide structure 110 is exposed toward the connection port. The guide grooves 150 are formed for the optical fiber 1 to be placed and connected therein. The guide grooves 150 may be V-shaped in order to enable the optical fiber 1 placed therein to stop by itself and allow an optical signal to enter the optical waveguide structure 110 along the direction parallel to the front face. Moreover, this structure is easily achievable. Preferably, inner walls of the guide grooves 150 are plated thereon with a metal plating layer such as a nickel-gold plating layer.

With continued reference to FIG. 1, the plastic encapsulation layer 130 is provided on the front face thereof with a first structure, which is electrically connected on the side of the front face of the plastic encapsulation layer 130 to the conductive material in the through holes 140 and to the heat dissipation structure 120.

The first structure includes a first passivation layer 210, a first metal layer 220 and a second passivation layer 230, which are sequentially stacked over the front face of the plastic encapsulation layer 130 in this order. The first passivation layer 210 covers the front faces of the plastic encapsulation layer 130 and of the heat dissipation structure 120. For space saving, the first passivation layer 210 may further cover the front face of the optical waveguide structure 110, enabling the first metal layer to further extend over the front face of the optical waveguide structure 110. This allows for improved utilization of the front face of the plastic encapsulation layer 130. From the first passivation layer 210, the conductive material in the through holes 140, a front face portion of the heat dissipation structure 120, the light exit port 211 and the guide grooves 150 are exposed on the side of the front face of the plastic encapsulation layer 130.

The first metal layer 220 lies on part of the first passivation layer 210. The first metal layer 220 includes multiple first bond pads and internal circuitry. The first bond pads in the first metal layer 220 are electrically connected to the conductive material in the through holes 140 and the heat dissipation structure 120.

The second passivation layer 230 covers the first passivation layer 210 and the first metal layer 220. The first passivation layer 210 and the second passivation layer 230 are provided for electrical isolation of the first metal layer 220 and for avoidance of a short circuit occurring thereto. From the second passivation layer 230, the heat dissipation structure 120, the light exit port 211, the guide grooves 150 and part of the first metal layer 220 are exposed.

The second passivation layer 230 is provided therein with at least two first connection holes 240, in which the first metal layer 220 is exposed. A conductive material is filled in the first connection holes 240 for electrical connection of device(s) above the first connection holes 240, such as the photonic chip.

Both the first passivation layer 210 and the second passivation layer 230 are insulating materials, such as polymer materials. Additionally, each of them may be, for example, polyimide, benzocyclobutene (BCB), poly(p-phenylenebenzobisoxazole) (PBO), or a combination of several of them. The materials of the first passivation layer 210 and the second passivation layer 230 may be either the same or different. In the present embodiment, the first passivation layer 210 and the second passivation layer 230 are the same material, for example, polyimide.

The first metal layer 220 may be a metal material such as Cu, Ag, W or Au, a conductive alloy, an inorganic material such as a conductive oxide (e.g., indium tin oxide, ITO), or a conductive organic material such as a conductive polymer. A thickness of the first metal layer 220 above the surface of the first passivation layer 210 is about 3 μm to 10 μm, preferably 3 μm to 5 μm.

The plastic encapsulation layer 130 is provided on the back face with a second structure, which is electrically connected on the side of the back face of the plastic encapsulation layer 130 to the conductive material in the through holes 140 and to the heat dissipation structure 120. The second structure includes a third passivation layer 310, a second metal layer 320 and a fourth passivation layer 330, which are sequentially stacked over the back face of the plastic encapsulation layer 130 in this order. The third passivation layer 310 covers the back faces of the plastic encapsulation layer 130 and of the heat dissipation structure 120, while the conductive material in the through holes 140, a back face portion of the heat dissipation structure 120 and a back face portion of the plastic encapsulation layer are exposed from the back face of the plastic encapsulation layer 130.

The second metal layer 320 includes multiple second bond pads, the multiple second bond pads are formed on portions of the third passivation layer 310 and are electrically connected to the conductive material in the through holes 140 and the heat dissipation structure 120.

The fourth passivation layer 330 covers the third passivation layer 310 and the second metal layer 320. The third passivation layer 310 and the fourth passivation layer 330 are provided for electrical isolation of the second metal layer 320 and for avoidance of a short circuit occurring thereto.

The fourth passivation layer 330 is provided therein with at least two second connection holes 340, the second metal layer 320 is exposed in the at least two second connection holes 340. A conductive material is filled in the second connection holes 340 for electrical connection of external circuit(s) (e.g., a PCB substrate, a FPC substrate, etc.)

Both the third passivation layer 310 and the fourth passivation layer 330 are insulating materials, such as polymer materials. Additionally, each of them may be, for example, polyimide, BCB, PBO or a combination of several of them. Among the materials of the first passivation layer 210, the second passivation layer 230, the third passivation layer 310 and the fourth passivation layer 330, it is possible that all of them are the same, or that one or more of them are same while each of the remaining one(s) is different therefrom, or that each of them is different from any of the remaining ones. In the present embodiment, the third passivation layer 310 and the fourth passivation layer 330 are the same material, for example, polyimide.

The second metal layer 320 may be a metal material such as Cu, Ag, W or Au, a conductive alloy, an inorganic material such as a conductive oxide (e.g., ITO), or a conductive organic material such as a conductive polymer. A thickness of the second metal layer 320 above the surface of the third passivation layer 310 is about 3 μm to 10 μm, preferably 3 μm to 5 μm.

The silicon photonic package further include the photonic chip (not shown in the figures), which is disposed on the first structure, electrically connected to the first structure and optically connected to the front face of the optical waveguide structure. Stated in greater detail, the photonic chip has an optical connection port optically connected to the light exit port 211 and an electrical connection port electrically connected to the first structure.

In the present embodiment, embedding the optical waveguide structure 110 and the heat dissipation structure 120 in the plastic encapsulation layer 130 results in improved heat dissipation performance. In the silicon photonic package of the present embodiment, directly forming the first and second structures on the opposite sides of the plastic encapsulation layer 130 in lieu of the conventional PCB substrate and optical path results in higher spatial utilization and allows the silicon photonic package to have a smaller size, resulting in space savings. Further, the structure of the optical waveguide structure 110 in the present embodiment greatly reduces loss of an optical signal during its propagation in the optical waveguide structure 110.

With continued reference to FIG. 1, in the present embodiment, there is also provided a method of fabricating a silicon photonic package, which includes the steps as follows.

S1: Provide an optical waveguide structure 110 and a heat dissipation structure 120 to be packaged. The optical waveguide structure 110 is a right trapezoidal structure having opposing front and back faces. A longitudinal cross-section of the structure has opposing first base 111a and second base 111b and opposing first leg 111c and second leg 111d. The first base is disposed on the front face of the optical waveguide structure, and the second base is disposed on the back face of the optical waveguide structure. A length of the first base 111a is greater than a length of the second base 111b, and an angle between the first base 111a and the first leg 111c is 90°. An angle between the first base 111a and the second leg 111d is around 45°. The optical waveguide structure 110 is connected to an optical fiber in a plane where the first leg 111c is disposed. The second leg 111d is disposed on a totally reflecting surface, which can totally reflect an optical signal entering the optical waveguide structure 110 from a surface where the first leg 111c is disposed along a direction parallel to the front face to a plane where the first base 111a is disposed. The heat dissipation structure has opposing front and back faces, and the second leg is disposed between the heat dissipation structure and the first leg.

In this step, the optical waveguide structure 110 includes a light guide 111 and a low-reflectivity coating 112 applied to one surface of the light guide 111. The low-reflectivity coating 112 has a reflectivity lower than a reflectivity of the light guide 111. The optical waveguide structure 110 is provided with a light exit port 211 in the front face and a connection port in the plane where the first leg 111c is disposed. The light guide 111 is exposed in the light exit port 211 and the connection port.

S2: Provide a first carrier plate formed on one side thereof with a first adhesive layer and place the optical waveguide structure 110 and the heat dissipation structure 120 on the first adhesive layer so that they are spaced apart from each other. The front faces of the heat dissipation structure 120 and the optical waveguide structure 110 both face the first adhesive layer, and the first carrier plate has a rectangular or a circular shape, for example.

S3: Fill a plastic encapsulation material in between the optical waveguide structure 110 and the heat dissipation structure 120 and cure the plastic encapsulation material to form a plastic encapsulation layer 130. The plastic encapsulation layer 130 has opposing front and back faces and opposing first and second side faces. The front faces of the plastic encapsulation layer 130, the optical waveguide structure 110 and the heat dissipation structure 120 are disposed on the same side. The first side face of the plastic encapsulation layer 130 is disposed parallel to the plane where the first leg 111c is disposed, and the first leg 111c is disposed between the first side face and the second leg 111d. Additionally, the front faces of the heat dissipation structure 120 and the optical waveguide structure 110 are exposed from the front face of the plastic encapsulation layer 130, and the back face of the heat dissipation structure 120 is exposed from the back face of the plastic encapsulation layer 130. The back face of the optical waveguide structure 110 is situated between the front and back faces of the plastic encapsulation layer 130.

S4: Remove the first carrier plate.

S5: Form multiple through holes 140 in the plastic encapsulation layer 130, the multiple through holes 140 extend through the plastic encapsulation layer 130 in the thickness direction thereof, fill a conductive material in the through holes 140, form on the front face of the plastic encapsulation layer 130 a first structure electrically connected on the side of the front face of the plastic encapsulation layer 130 to the conductive material in the through holes 140 and to the heat dissipation structure 120, and form a second structure on the back face of the plastic encapsulation layer 130, the second structure is electrically connected on the side of the back face of the plastic encapsulation layer 130 to the conductive material in the through holes 140 and to the heat dissipation structure 120.

In this step, guide grooves 150 are further formed in the plastic encapsulation layer 130. The guide grooves 150 are formed in the front face of the plastic encapsulation layer 130 so as to extend through the side face of the plastic encapsulation layer 130 proximate the first leg 111c (i.e., the first side face). Additionally, the connection port is exposed in the guide grooves.

The guide grooves 150 are formed by a laser. A first passivation layer 210 in the first structure is perforated so that the light exit port 211, the conductive material in the through holes 140 and a front face portion of the heat dissipation structure 120 are exposed. A second passivation layer 230 in the first structure is perforated so that at least two first connection holes 240 are formed, in which a first metal layer 220 is exposed. A nickel-gold plating layer is plated, or a solder material is applied, within the at least two first connection holes 240, in order to enable connection to device(s). A third passivation layer 310 in the second structure is perforated so that the conductive material in the through holes 140 and a back face portion of the heat dissipation structure 120 are exposed. A fourth passivation layer 330 in the second structure is perforated so that at least two first connection holes 240 are formed, in which at least two second connection holes 340 are formed, in which a second metal layer 320 is exposed. A nickel-gold plating layer is plated, or a solder material is applied, within the at least two second connection holes 340, in order to enable connection to external circuit(s).

S7: Provide a photonic chip and fix it to the first structure in such a manner that it is electrically connected to the first structure and optically connected to the front face of the optical waveguide structure. Stated in greater detail, the photonic chip has an optical connection port optically connected to the light exit port 211 and an electrical connection port electrically connected to the conductive material in some of the first connection holes 240. The electrical connection port is soldered to the first structure.

In summary, the present invention provides a silicon photonic package and a method of fabricating the package. The silicon photonic package includes an optical waveguide structure, a heat dissipation structure, a plastic encapsulation layer, a first structure, a second structure and a photonic chip. The optical waveguide structure is a right trapezoidal structure having opposing front and back faces, a longitudinal cross-section of which has opposing first and second bases and opposing first and second legs. The first base is disposed on the front face of the optical waveguide structure, and the second base on the back face of the optical waveguide structure. A length of the first base is greater than a length of the second base, and an angle between the first base and the first leg is 90°. An angle between the first base and the second leg is around 45°. The optical waveguide structure is connected to an optical fiber in a plane where the first leg is disposed. The heat dissipation structure and the optical waveguide structure are spaced apart from each other and are both embedded in the plastic encapsulation layer. The heat dissipation structure has opposing front and back faces, and the second leg is disposed between the heat dissipation structure and the first leg. The plastic encapsulation layer has opposing front and back faces and opposing first and second side faces. The front faces of the optical waveguide structure, the heat dissipation structure and the plastic encapsulation layer are disposed on the same side. The first side face of the plastic encapsulation layer is disposed parallel to the plane where the first leg is disposed, and the first leg is disposed between the first side face and the second leg. The front faces of the optical waveguide structure and the heat dissipation structure are exposed from the front face of the plastic encapsulation layer, and the back face of the heat dissipation structure is exposed from the back face of the plastic encapsulation layer. The back face of the optical waveguide structure is disposed between the front and back faces of the plastic encapsulation layer. The plastic encapsulation layer is provided therein with multiple through holes extending through the plastic encapsulation layer in the thickness direction, and a conductive material is filled in the multiple through holes. The first structure is disposed on the front face of the plastic encapsulation layer and is electrically connected on the side of the front face of the plastic encapsulation layer to the conductive material in the through holes and to the heat dissipation structure. The second structure is disposed on the back face of the plastic encapsulation layer and is electrically connected on the side of the back face of the plastic encapsulation layer to the conductive material in the through holes and to the heat dissipation structure. The photonic chip is disposed on the first structure, electrically connected to the first structure and optically connected to the front face of the optical waveguide structure. When an optical signal propagates in the optical waveguide structure of the present invention, it will experience substantially no loss. Therefore, the optical waveguide structure allows for a significant reduction in propagation loss of an optical signal. Moreover, embedding the optical waveguide structure and the heat dissipation structure in the plastic encapsulation layer results in improved heat dissipation performance. In addition, in the silicon photonic package of the present invention, directly forming the first and second structures on the opposite sides of the plastic encapsulation layer in lieu of the conventional PCB substrate and optical path results in higher spatial utilization and allows the silicon photonic package to have a smaller size, resulting in space savings.

It is to be noted that, as used herein, the terms "first" and "second" are only meant to distinguish various components, elements, steps, etc. from each other rather than indicate logical or sequential orderings thereof, unless otherwise indicated or specified.

It is to be understood that while the invention has been described above with reference to preferred embodiments thereof, it is not limited to these embodiments. In light of the above teachings, any person familiar with the art may make many possible modifications and variations to the disclosed embodiments or adapt them into equivalent embodiments, without departing from the scope of the invention. Accordingly, it is intended that any and all simple variations, equivalent changes and modifications made to the foregoing embodiments based on the substantive disclosure of the invention without departing from the scope thereof fall within this scope.

What is claimed is:

1. A silicon photonic package, comprising an optical waveguide structure, a heat dissipation structure, a plastic encapsulation layer, a first structure, a second structure and a photonic chip, the optical waveguide structure implemented as a right trapezoidal structure having opposing front and back faces, a longitudinal cross-section of the optical waveguide structure comprises opposing first and second bases and opposing first and second legs, the first base disposed on the front face of the optical waveguide structure, the second base disposed on the back face of the optical waveguide structure, the first base having a length greater than a length of the second base, wherein an angle formed between the first base and the first leg is 90°, an angle formed between the first base and the second leg is around 45°, the optical waveguide structure is connected to an optical fiber in a plane where the first leg is disposed, the second leg is disposed on a totally reflecting surface capable of totally reflecting an optical signal that enters the optical waveguide structure from a surface where the first leg is disposed in a direction parallel to the front face to a plane where the first base is disposed, the heat dissipation structure spaced apart from the optical waveguide structure and embedded together therewith in the plastic encapsulation layer, the heat dissipation structure having opposing front and back faces, the second leg disposed between the heat dissipation structure and the first leg;

the plastic encapsulation layer having opposing front and back faces and opposing first and second side faces, the front faces of the optical waveguide structure, the heat dissipation structure and the plastic encapsulation layer disposed on the same side, the first side face of the plastic encapsulation layer disposed parallel to the plane where the first leg is disposed, the first leg disposed between the first side face and the second leg, the front faces of the optical waveguide structure and the heat dissipation structure exposed from the front face of the plastic encapsulation layer, the back face of the heat dissipation structure exposed from the back face of the plastic encapsulation layer, the back face of the optical waveguide structure disposed between the front and back faces of the plastic encapsulation layer, the plastic encapsulation layer provided therein with multiple through holes extending through the plastic encapsulation layer along its thickness direction, the multiple through holes filled therein with a conductive material, the first structure disposed on the front face of the plastic encapsulation layer, the first structure electrically connected on the side of the front face of the plastic encapsulation layer to the conductive material in the through holes and to the heat dissipation structure, the second structure disposed on the back face of the plastic encapsulation layer, the second structure electrically connected on the side of the back face of the plastic encapsulation layer to the conductive material in the through holes and to the heat dissipation structure, the photonic chip disposed on the first structure such as to be electrically connected to the first structure and optically connected to the front face of the optical waveguide structure.

2. The silicon photonic package of claim 1, wherein the angle formed between the first base and the second leg is 45°.

3. The silicon photonic package of claim 1, wherein the optical waveguide structure comprises a light guide and a low-reflectivity coating applied to a surface of the light guide, the light guide made of glass, the low-reflectivity coating having a reflectivity lower than a reflectivity of the light guide and thus enabling an optical signal that enters the optical waveguide structure from the surface where the first leg is disposed in the direction parallel to the front face of the optical waveguide structure to be totally reflected by the surface where the second leg is disposed to the plane where the first base is disposed.

4. The silicon photonic package of claim 3, wherein the optical waveguide structure is provided in the plane where the first leg is disposed with a connection port adapted for connection of the optical fiber, and wherein the light guide is exposed from the low-reflectivity coating at the connection port.

5. The silicon photonic package of claim 4, wherein the plastic encapsulation layer is provided in the front face thereof with guide grooves, which extend through the plastic encapsulation layer between the first side face and the connection port, and in which the optical fiber is placed.

6. The silicon photonic package of claim 5, wherein the guide grooves are V-shaped grooves.

7. The silicon photonic package of claim 4, wherein the optical waveguide structure is provided in the front face with a light exit port, at which the light guide is exposed from the low-reflectivity coating, and which is adapted for connection of the photonic chip and for passage therethrough of an optical signal that enters the optical waveguide structure from the connection port in the direction parallel to the front face of the optical waveguide structure and is totally reflected by the surface where the second leg is disposed to the photonic chip in a direction perpendicular to the front face of the optical waveguide structure.

8. The silicon photonic package of claim 7, wherein the light exit port has a circular or rectangular shape.

9. The silicon photonic package of claim 7, wherein the photonic chip has an optical connection port and an electrical connection port, the optical connection port optically connected to the light exit port, the electrical connection port electrically connected to the first structure.

10. The silicon photonic package of claim 1, wherein the optical waveguide structure has a thickness of from 100 μm to 150 μm.

11. The silicon photonic package of claim 1, wherein the first structure comprises a first passivation layer, a first metal layer and a second passivation layer, which are formed sequentially over the front face of the plastic encapsulation layer, the first passivation layer covering the front faces of the plastic encapsulation layer, the heat dissipation structure and the optical waveguide structure, with the conductive material in the through holes, a front face portion of the heat dissipation structure, the light exit port of the optical waveguide structure and the guide grooves in the front face of the plastic encapsulation layer being exposed therefrom on the side of the front face of the plastic encapsulation layer, the first metal layer disposed on part of the first passivation layer, the first metal layer comprising multiple first bond pads electrically connected to the conductive material in the through holes and the heat dissipation structure, the second passivation layer covering the first passivation layer and the first metal layer, the second passivation layer provided therein with at least two first connection holes in which the first metal layer is exposed, the first connection holes filled with a conductive material for electrical connection with the photonic chip.

12. The silicon photonic package of claim 1, wherein the second structure comprises a third passivation layer, a second metal layer and a fourth passivation layer, which are formed sequentially over the back face of the plastic encapsulation layer, the third passivation layer covering the back faces of the plastic encapsulation layer and the heat dissipation structure, with the conductive material in the through holes and a back face portion of the heat dissipation structure being exposed from the back face of the plastic encapsulation layer, the second metal layer comprising multiple second bond pads disposed on part of the third passivation layer and electrically connected to the conductive material in the through holes and to the heat dissipation structure, the fourth passivation layer covering the third passivation layer and the second metal layer, the fourth passivation layer provided therein with at least two second connection holes in which the second metal layer is exposed, the second connection holes filled with a conductive material for electrical connection with an external circuit.

13. A method of fabricating a silicon photonic package, suitable for use with the silicon photonic package of claim 1, the method comprising the steps of:

providing an optical waveguide structure and a heat dissipation structure to be packaged, the optical waveguide structure implemented as a right trapezoidal structure having opposing front and back faces, a longitudinal cross-section of the optical waveguide structure comprises opposing first and second bases and opposing first and second legs, the first base disposed on the front face of the optical waveguide structure, the second base disposed on the back face of the optical waveguide structure, the first base having a length greater than a length of the second base, wherein an angle formed between the first base and the first leg is 90°, an angle formed between the first base and the second leg is around 45°, the optical waveguide structure is connected to an optical fiber in a plane where the first leg is disposed, the second leg is disposed on a totally reflecting surface capable of totally reflecting an optical signal that enters the optical waveguide structure from a surface where the first leg is disposed in a direction parallel to the front face to a plane where the first base is disposed, the heat dissipation structure having opposing front and back faces, the second leg disposed between the heat dissipation structure and the first leg;

providing a first carrier plate with a first adhesive layer formed on one side thereof and placing the optical waveguide structure and the heat dissipation structure on the first adhesive layer, wherein the heat dissipation structure and the optical waveguide structure are spaced apart from each other, and wherein the front faces of the heat dissipation structure and the optical waveguide structure both face the first adhesive layer;

filling a plastic encapsulation material in between the optical waveguide structure and the heat dissipation structure and curing the plastic encapsulation material to form a plastic encapsulation layer, the plastic encapsulation layer having opposing front and back faces and opposing first and second side faces, the front faces of the optical waveguide structure, the heat dissipation structure and the plastic encapsulation layer disposed on the same side, the first side face of the plastic encapsulation layer disposed parallel to the plane where the first leg is disposed, the first leg disposed between the first side face and the second leg, front faces of the optical waveguide structure and the heat dissipation structure exposed from the front face of the plastic encapsulation layer, the back face of the heat dissipation structure exposed from the back face of the plastic encapsulation layer, the back face of the optical waveguide structure disposed between the front and back faces of the plastic encapsulation layer;

removing the first carrier plate;

forming in the plastic encapsulation layer multiple through holes extending through the plastic encapsulation layer in its thickness direction, filling a conductive material in the multiple through holes, forming on the front face of the plastic encapsulation layer a first structure electrically connected on the side of the front face of the plastic encapsulation layer to the conductive material in the through holes and to the heat dissipation structure, and forming on the back face of the plastic encapsulation layer a second structure electrically connected on the side of the back face of the plastic encapsulation layer to the conductive material in the through holes and to the heat dissipation structure; and providing a photonic chip and fixing it to the first structure in such a manner that it is electrically connected to the first structure and optically connected to the front face of the optical waveguide structure.

14. The method of claim 13, wherein guide grooves are formed in the front face of the plastic encapsulation layer in such a manner that the guide grooves extend through the plastic encapsulation layer between the first side face and a connection port and that the connection port is exposed in the guide grooves.

15. The method of claim 13, wherein the photonic chip has an optical connection port and an electrical connection port, the optical connection port optically connected to a light exit port, the electrical connection port electrically connected to the first structure.

* * * * *